United States Patent [19]

Bauer

[11] Patent Number: 4,636,961
[45] Date of Patent: Jan. 13, 1987

[54] CONTROL DEVICE FOR A HAND-OPERATED ELECTRIC POWER TOOL

[75] Inventor: Hans-Peter Bauer, Rutesheim, Fed. Rep. of Germany

[73] Assignee: Robert Bosch GmbH, Stuttgart, Fed. Rep. of Germany

[21] Appl. No.: 633,572

[22] Filed: Jul. 23, 1984

[30] Foreign Application Priority Data

Aug. 19, 1983 [DE] Fed. Rep. of Germany ....... 3329971

[51] Int. Cl.[4] .......................... G06F 15/46; H02P 7/28
[52] U.S. Cl. .................................... 364/474; 318/305;
318/490; 364/174; 364/188
[58] Field of Search ................. 364/474, 475, 140–147,
364/174, 188–193; 408/9, 16; 318/305, 490

[56] References Cited

U.S. PATENT DOCUMENTS

| 4,272,821 | 6/1981 | Bradus | 364/475 |
| 4,317,176 | 2/1982 | Saar et al. | 318/305 X |
| 4,410,846 | 10/1983 | Gerber et al. | 364/174 X |
| 4,513,381 | 4/1985 | Houser, Jr. et al. | 364/191 X |
| 4,536,688 | 8/1985 | Roger | 318/490 |

Primary Examiner—Joseph Ruggiero
Attorney, Agent, or Firm—Michael J. Striker

[57] ABSTRACT

An adjustment circuit for a hand-operated electric power tool includes a data input device for entering information concerning the kind of material to be treated and other information relevant to the operation of the tool. The selected binary coded address word is applied to addressing inputs of a read only memory storing control words for a controlling device for a motor of the tool. Part of the bits of a control word outputted from the ROM are applied to a display device which displays the desired or actual rotary speeds of the tool and/or other data selected by the input device.

8 Claims, 6 Drawing Figures

CONTROL DEVICE FOR A HAND-OPERATED ELECTRIC POWER TOOL

BACKGROUND OF THE INVENTION

The present invention relates to a hand-operated electrical power tool, particularly a power drill, having a rotary speed control device, an input device for entering data indicative of material to be worked on and additional data relevant to the operation of the tool, and a device for adjusting the rotary speed control device according to the entered data.

Hand-held electrical power drills are already known which are controlled by a microprocessor. In these known electrical power drills the kind of material to be worked on and diameter of the drill bit are preselectable. The microprocessor computes on the basis of the these data an optimum rotary speed which guarantees a flawless machining of the workpiece on the one hand, and prevents any damage of the drill bit or of the tool on the other hand. The computed rotary speed value is fed to a regulating circuit which adjusts the electric motor of the power drill according to this desired speed. The electronically controlled drilling machine of this kind however is rather expensive to manufacture inasmuch as apart from the central control unit there are necessary storage devices both for fixed data and for variable operational data to control the microprocessor according to a program. For preparing and entering the program additional expenses are involved and consequently the electronic circuits of microprocessor controlled drills are extremely costly and susceptible to interferences, particularly they are sensitive to stray electric fields from the electric motor.

SUMMARY OF THE INVENTION

It is therefore the general object of the present invention to overcome the disadvantages of prior art hand-operated tools of the before-described kind.

In particular, it is an object of this invention to provide an improved electronically controlled power tool whose electronic control is simple in design and requiring less component parts than prior art control circuits of this kind.

Another object of this invention is to provide such an improved electric power tool which can be manufactured at a lower cost by eliminating the central control unit.

Still another object of this invention is to provide such an improved control device for electric power tool which employs static component parts only so that it is substantially unsensitive to electrical interferences.

Furthermore, an object of this invention is provide a control circuit for power tool in which modifications of operational parameters for example changes of the maximum permissible rotary speed of the driving motor, are greatly facilitated by exchanging only a single component part.

An additional objective of this invention is to provide such an improved control circuit which can be readily installed in hand-operated power tools of different types whereby the setting of individual data for different tools is accomplished simply by substituting storage devices in which the corresponding values are stored.

In keeping with these objects and others which will become apparent hereafter, one feature of the invention resides in a hand-operated power tool of the aforedescribed kind, in the provision of a storage device having addressing inputs and data outputs and storing data relevant to materials to be worked on and additional data relevant to the operation of the tool, an input selector connected to the addressing inputs of the storage device, a data display device connected to a part of the data outputs of the storage device for displaying the selected information and another part of the data outputs being connected to the controlling device to adjust rotary speed of the motor according to the selected data.

Preferably, the input device generates binary output signals which are employed as addresses for the storage device which is preferably in the form of a ROM or PROM and the other part of the output signals from the storage device which are fed to the control device of the motor of the tool, corresponds to the selected input data. As a result, the optimum rotary speed of the electric motor of the tool is adjusted. At the same time, the first mentioned part of the output signal from the storage device serves for displaying the selected material, rotary speed and the like. In this manner, a particular simple circuit design is achieved. In a modification of this invention, there are provided additional addressing inputs by means of which an information about the operation condition of the power tool can be displayed. Therefore, prior art mechanical protective devices for avoiding operational errors, such as for example a suppressor of impact boring at counterclockwise drive of the drills can be dispensed with. In a further modification, an output signal from the storage device is utilized for limiting the rotary speed of the motor of the tool. This measure enables the user of the tool to set lower operational speeds whereby those speeds at which the tool might become damaged, are eliminated. The advantage of this invention also resides in the fact that the output signals from the storage device immediately adjusts the controlling device of the tool for adjusting an optimum rotary speed of the electric motor of the tool. In other words, the outputted data word represents the nominal value of the rotary speed regulator. It is also advantageous when the output signal of the storage device is displayed on the displaying device. According to one feature of this invention, a part of the output signals from the storage device is directly applied to the display device so that conventional decoding circuit for the display can be eliminated. The storage device also stores an information concerning the maximum permissible rotary speed of the motor which can be readily displayed together with a preset optimum rotary speed of the tool and with other relevant operational magnitudes. For keying input information to the addressing inputs of the storage device, the input selector employs preferably coding keys or a correspondingly coded rotary control knob. The input devices of this kind are mechanically very stable and guarantee a reliable input of addresses in a very simple manner. The arrangement of this invention uses electronic component parts which are robust and resistant to interferences. A particularly simple control is achieved by means of two keys only. In this case, by successive depressions of one key an operational value for example an optimum rotary speed for the material to be worked on is selected and by compressing the other key the diameter of the drill bit is entered. The input device uses preferably a shift register or a counter.

The novel features which are considered as characteristic for the invention are set forth in particular in the appended claims. The invention itself however both as to its construction and its method of operation together with additional objects and advantages thereof will be best understood from the following description of specific embodiments when read in connection with the accompanying drawing.

DESCRIPTION OF THE PREFERRED EMBODIMENTS

Figure 1:
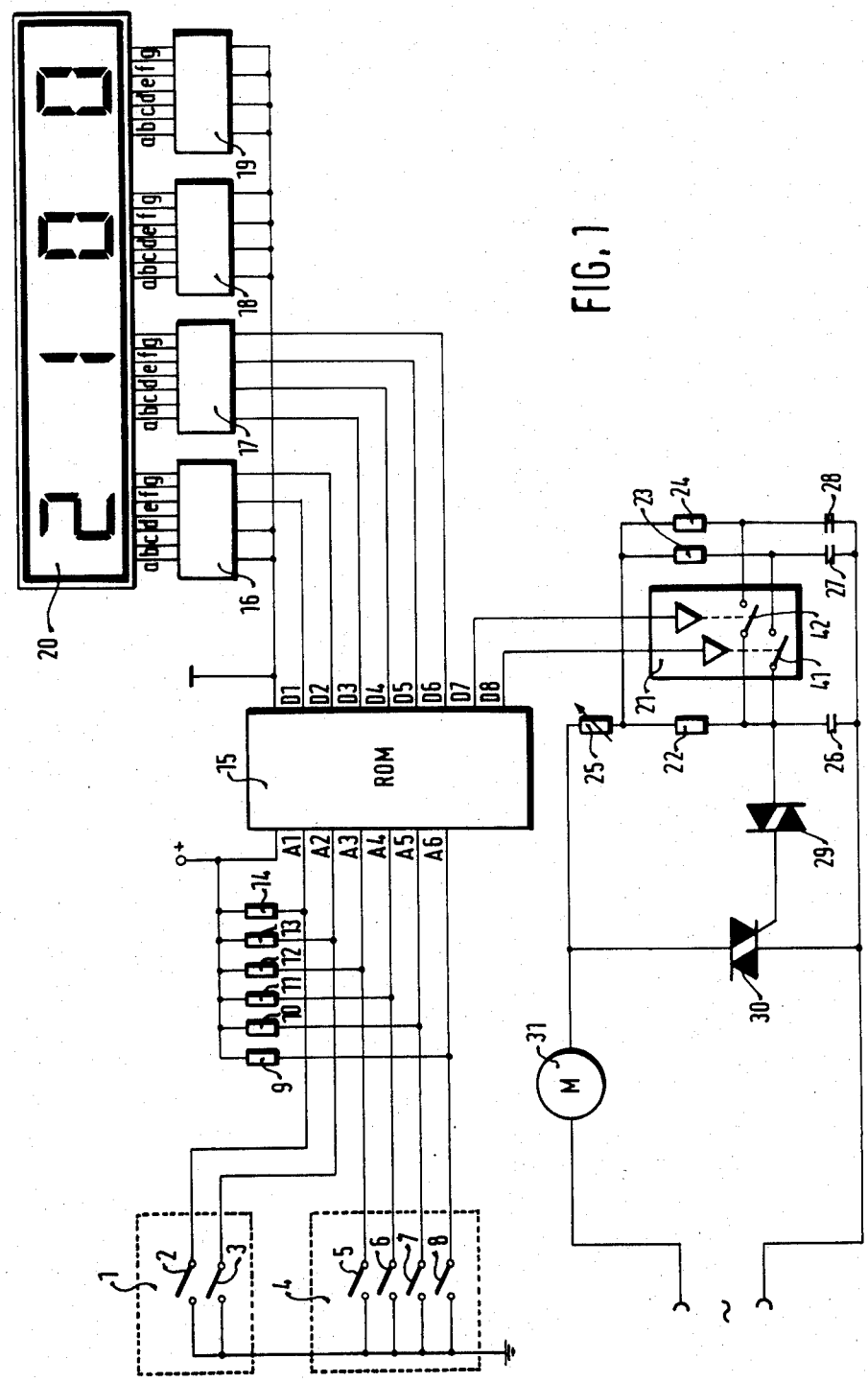
FIG. 1 is a block circuit diagram of the control arrangement according to this invention in connection with an electrical piercing saw.

The control arrangement for a compass or piercing saw shown in FIG. 1 includes a data input device having a first part 1 consisting of switches 2 and 3, and a second part 4 consisting of switches 5-8. The data input part 1 for a compass saw serves for entering address data pertaining to a kind and a thickness of material to be processed. By selecting different positions of switches 2 and 3 different binary codes corresponding to four material groups, are generated. The second part 4 in the case of a compass saw serves for presetting different thicknesses of the processed material, namely the four switches 5-8 can produce up to sixteen binary codes to which different material thicknesses are assigned. One of the contacts of the respective switches 2, 3 and 5-8 is grounded whereas the other contact is connected to one of the addressing inputs A1-A6 of a read-only memory (ROM) 15. The other contacts of the data selector switches 2, 3 and 5-8 are connected via resistors 9-14 to the plus pole of a power source. The power supply terminals of ROM 15 are connected to the grounded pole and to the plus pole of the source.

Data outputs D1 and D2 of the ROM 15 are connected to a decoder and a driver 16. The data outputs D3-D6 are connected to another decoder and a driver 17, whereas the data outputs D7 and D8 are connected to an analog switch 21. The inputs of the decoders and the drivers 18 and 19 and two of the inputs of the decoder and driver 16 are grounded. The analog switch 21 includes two switches 41 and 42 of which the switch 41 is operated by the output D8 and the switch 42 by the output D7 of the ROM. The driving motor 31 of the electrical compass or piercing saw is connected via a triac 30 to an alternating current source. The connection point of motor 31 and of the triac 30 is connected through a series connection of a potentiometer 25, a timing resistor 22 and a timing capacitor 26 to the other terminal of the source. Trigger diode 29 is connected between the gate of the triac 30 and the connection point of the resistor 22 and capacitor 26. Additional RC members assembled of a series connections of a resistor 23 and a capacitor 27 and a series connection of resistor 24 and capacitor 28 are connected parallel to the first mentioned RC member 22, 26. The connection point of resistor 22 and capacitor 26 is connectable by the switch 42 to the connection point between resistor 24 and 28, and by switch 41 to the connection point between resistor 23 and capacitor 27.

The circuit further includes a four-digit display device 20 which serves for the indication of the desired number of strokes of the saw blade. Since the stroke rate is to be shown in the steps of hundreds only, the decoders and drivers 18 and 19 are grounded to indicate always a zero. The decoders and drivers 16 and 17 are controlled by the output signals from the ROM 15 so as to produce the indication of the maximum or actual number of strokes of the blade in accordance with the address contents of the ROM 15.

When the part 1 of the data input device is actuated in accordance with the kind of material to be sawed, and the second data input part 4 is actuated according to the thickness of the material, then two binary words forming together an address are applied to the addressing inputs A1-A6 of the ROM 15 and address a specific control word so tred at a corresponding storing location in the ROM. As a result, binary data or bits read out at respective outputs D1-D8 of the ROM are used both for the adjustment of the optimum rotary speed of the motor according to the selected value and for the display of the corresponding optimum number of strokes of the saw blade on the display device 20. Whereas the ROM outputs D1-D6 serve for the display of the optimum number of strokes, the signals from the outputs D7 and D8 limit the maximum rotary speed of the motor according to the preselected values. By different combinations of the parallel connections of the RC members 23, 27 or 24, 28, four different rotary speeds of the motor will be set. The range of the time course of the voltage at the trigger diode 29 is adjusted by the potentiometer 25 and this range is further adjusted by the additional resistors and capacitors 23 and 24 and 27 and 28. The particular form of voltage at the trigger diode 29 thus determines a corresponding rotary speed of the motor within a permissible maximum range.

The correlation of rotary speed value and of the control signal for the limiting of the rotary speed is programmed in the ROM or a programmable read only memory (PROM). Especially in a mass production, mass programmed ROMs are of particular advantage. On the other hand, PROM has the advantage that it can be programmed by the user and easily reprogrammed. Depending on the kind of the power tool used, a suitably programmed ROM is removably inserted in a socket of the control circuit in the tool and in this manner the control circuit can be readily modified for application in diverse kinds and types of power tools.

Figure 2:
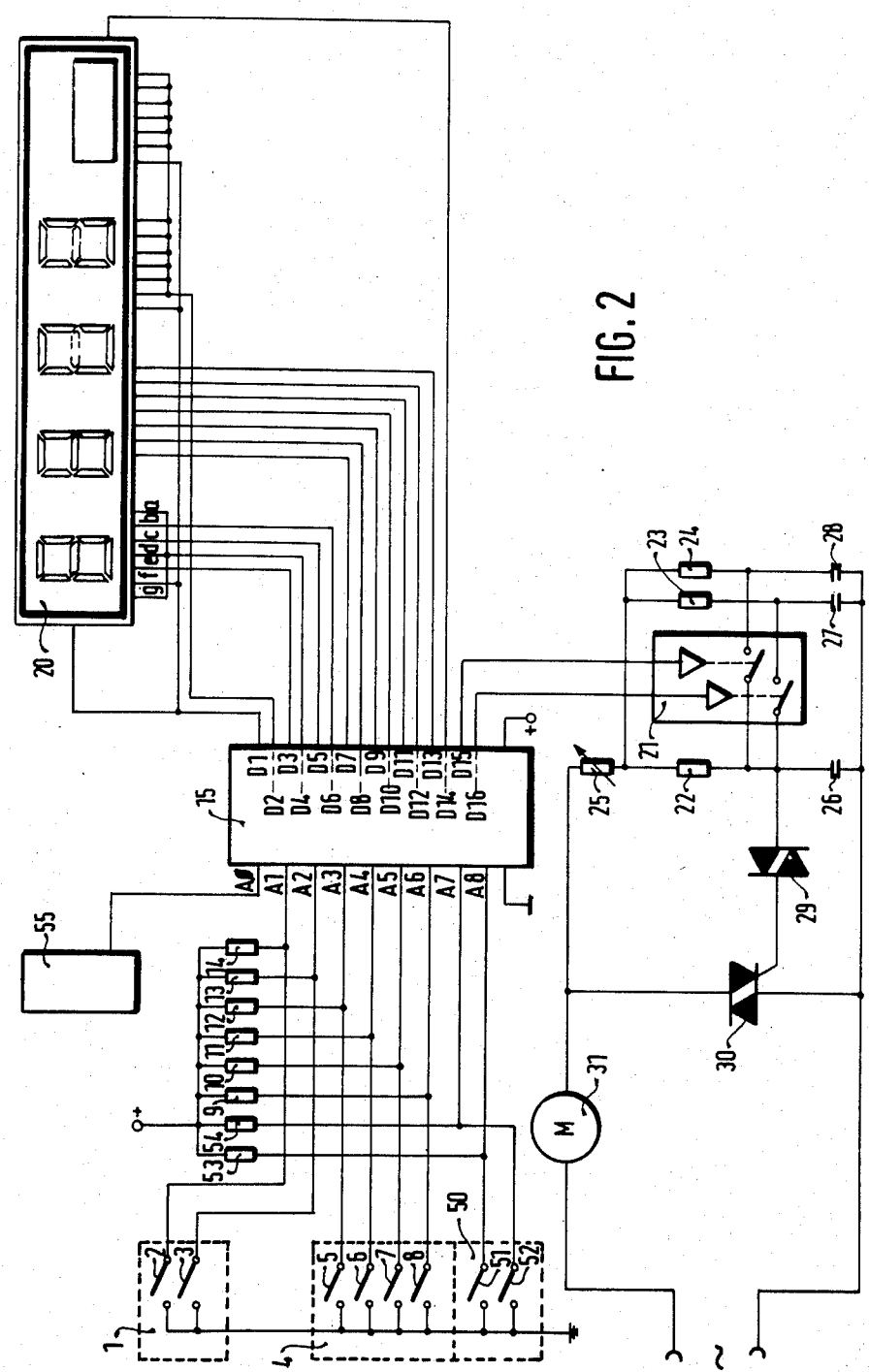
FIG. 2 is a control circuit arrangement of this invention in connection with a power drill.

FIG. 2 illustrates a modification of the control circuit of FIG. 1 for use in a hand-operated electrical power drill. When used in power drills, the circuit must be programmed according to the anticipated different kinds of materials to be worked on and according to a series of standard diameters of drill bits so as to regulate the driving motor of the drill to an optimum rotary speed. In order to obtain clear bores and to avoid any damage of the drill bit, an average rotary speed depending on the kind of the processed material is permissible and, in addition to the maximum rotary speed determined by the diameter of the drill bit, this range of rotary speeds must not be exceeded.

The circuit diagram of FIG. 2 is similar to that of FIG. 1. The control circuit again includes a data input device consisting of two input parts 1 and 4 including respectively switches 2, 3 and 5-8 for selecting the kind of material to be processed and for a preselecting the diameter of the employed drill bit. In addition, there is provided a data input part 50 with switches 51 and 52 for ascertaining the operational condition of the drilling machine. For instance, the switch 51 serves for determining the engaged gear stage in the tool whereas switch 52 determines the rotational direction (clockwise or counterclockwise). The output contacts of the switches in the three input parts 1, 4 and 50 are again similarly as in the preceding example, connected to the addressing inputs A1-A8 of the storage device 15. The resistors 9-14 and 53, 54 are the so-called "pull-up" resistors connecting the plus pole of a direct current power source to respective output contacts of the data input parts 1, 4 and 50. The other contacts of these parts are connected through the grounded pole of the power supply.

In contrast to the embodiment of FIG. 1, the data outputs D1-D4 of the storage device 15 are directly connected to the liquid crystal display 20. For this purpose, the input data for the display 20 stored in the storage device 15 are in the form required for the excitation of the liquid crystal segments. It should be taken into account that the liquid crystal display (LCD) must be controlled by an alternating voltage whereby, in synchronism with a signal for the common resetting electrode the excitation information and a corresponding inverse signal are alternately applied to all segments. For this reason, every two adjacent addresses in storage device 15 store data for a certain display contents and its corresponding complement. In order that the resulting direct current voltage component in the display be approximately zero volts so that a long service life of the display unit be insured, the voltage for the resetting electrode of the display 20 is also supplied from an output (D1) of the storage 15 and its resetting voltage depending on the signal applied to the address input A0, has the value either of logic 0 or 1. The addressing input A0 is controlled by an occillator 55 which generates a clock frequency pulses for the operation of LCD display, namely between 30 and 300 Hz. In this manner the address input A0 is continuously switched over between values 0 and 1. Accordingly, at the input D1 of the storage device 15 (ROM or PROM) an alternating signal at the same frequency is generated and the outputs D3-D14 deliver alternately at the same time rate the data and their complements read out by the addresses A1-A8. Since in this example the order of digits for ones and tens has always a zero value, all corresponding segments are combined together and connected to the output D2 which delivers the inverse signal relative to the output D1. Therefore, these segments become inactive and are at the potential of the resetting electrode. Since for the most significant values only digits 1, 2 and 3 are to be displayed, a part of the segments for the highest digital order can be also combined together. Therefore, the outputs D15 and D16 remain the same for both values of the input A0. In the output signal from the output D14 the user of the driling machine is notified by a suitable additional symbol on the display, which gear stage of the drilling machine is to be used.

In the modified version of this exemplary embodiment it is also possible to use the read out data signal from the storage for a fine setting of the rotary speed of the drill. For example, the output signals D1-D8 in the embodiment of FIG. 1 can deliver a detailed indication of the rotary speed of the machine. This bit-sequence of output signals can be if desired converted in a digital-/analog converter and employed as a desired value for the rotary speed regulator. Also all decoding and driving stages can be connected to the output D1-D8. In the case that the hand-held power tool includes a tacho generator for the rotary speed regulation, then there is a possibility to equip the display device 20 and its decoding and driving means 16-19 with a switch-over device. The switch-over device operates in such a manner that in rest condition of the power tool an optimum value of the rotary speed is indicated on the display 20 whereas during operation of the motor of the tool the momentary rotary speed is displayed.

This switch-over device is applicable in electric power tools of any type. For instance, in the case of electrically driven piercing saws, the switch-over device makes it possible to display, in addition to the kind of treated material, also the type of the employed saw blade or the depth of the cut.

Figure 3:
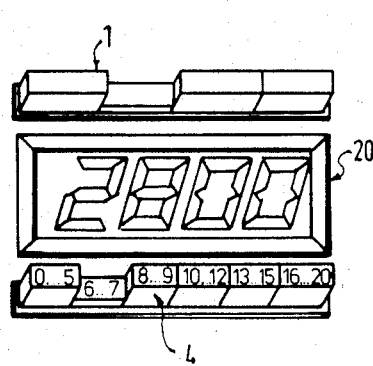
FIGS. 3-5 show different examples of input and display units for a hand-operated power drill.

FIG. 3 illustrates a modification of the data input device 1 and 4 together with the display device 20 in the control circuit of FIG. 1. The part 1 of the data input device includes four pushbuttons for producing binary codes corresponding to those of the switches 2 and 3 in FIG. 1. The pushbuttons are preferably labeled with inscriptions of different kinds of material to be processed by the tool. The display device 20 is arranged between the two parts 1 and 4 of the data input device to indicate the desired and actual rotary speeds of the tool. The data input part 4 in this example includes six pushbuttons for selecting a group of diameters of the drilling bit. If desired, each of the pushbuttons can control several switches to produce a desired code.

Figure 4:
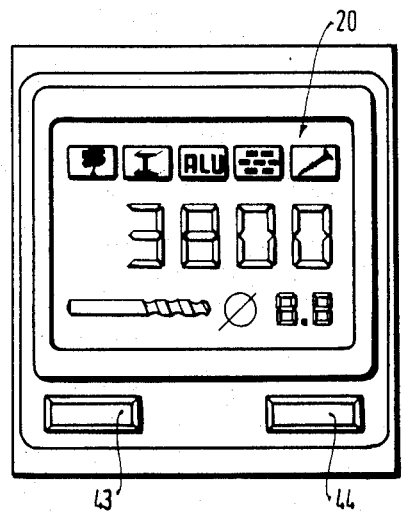

In another modification instead of producing a separate pushbutton for each kind of material or for each group of drill bit diameters, it is possible to use only two pushbuttons, each connected with a suitable electronic control circuit which in the simplest case, is in the form of a counter which after each actuation of the assigned pushbutton shifts the value to a next one. In this manner the storage unit is directly addressed and a considerable number of mechanical switching parts can be saved. FIG. 4 shows an embodiment of the above arrangement including a display device 20 and two data input keys 43 and 44. By depressing the key 43 the power tool is cyclically switched over from the momentary set speed pertaining to an assigned kind of material to the next one and at the same time the corresponding symbol of the selected material is displayed in the uppermost line of the display unit 20. This manipulation can be made continuous by keeping the pushbutton or key depressed whereby the switchover rate is determined by the electronic circuit. In this example, in addition to the selection of rotary speeds pertaining to different materials, there is also a sign "screw" at which the power tool runs at a particularly low rotary speed.

Figure 5:
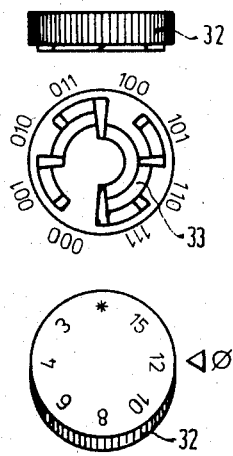

FIG. 5 shows a modification of the data input device in which the drill bit diameter or the material thickness are selected by means of a control wheel 32. The lower side of the narrow wheel 32 is provided with coding contacts 33 arranged in three radially spaced levers. This design of the data input device is particularly inexpensive in manufacture and is reliable in generating the coded signal for the storage device 15.

Figure 6:
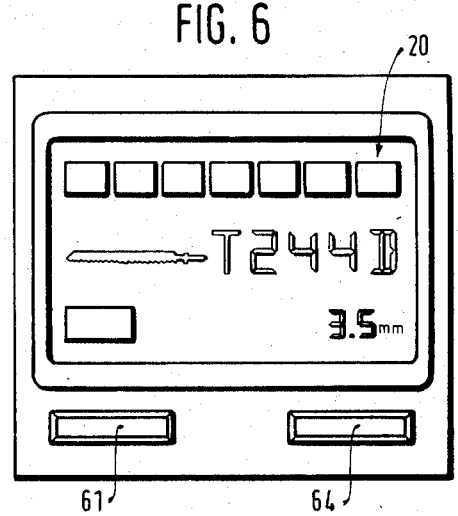
FIG. 6 is an exemplary embodiment of an input and display unit for a piercing saw.

FIG. 6 shows a control unit for piercing saws which is a modification of that of FIG. 4 used for drilling machines. In the display screen 20 there are again displayed symbols of materials of different kinds (uppermost line); the intermediate line displays the section of what kind of saw blade is to be used and the lowermost line displays the set thickness of material. The material to be processed is selected by repeated compressions of the key 61 whereas the thickness of material is selected by the key 64.

It will be understood that each of the elements described above or two or more together may also find a useful application in other types of constructions differing from the types described above.

While the invention has been illustrated and described as embodied in a control circuit for use with power saws and power drills, it is not intended to be limited to the details shown since various modifications and structural changes may be made without departing in any way from the spirit of the present invention.

Without further analysis the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A hand-operated electric power tool comprising means for controlling the operation of the tool; a device for storing binary control words each including a first group of bits for controlling a predetermined mode of operation of said tool and a second group of bits indicative of a rotary speed preset for a particular mode of operation; said storing device having addressing inputs for receiving a selected binary address word and data outputs for outputting a stored control word assigned to a selected address word; a data input device connected in parallel to said addressing inputs to apply a selected word thereto; a data display device connected in parallel to one part of said data outputs pertaining to said second group of bits to display a preset rotary speed value; and said means for controlling the operation of the tool being connected to another part of said data outputs pertaining to said first group of bits.

2. A hand-operated electric power tool as defined in claim 1 wherein from the other part of the data outputs of the storage device limit the maximum rotary speed of the tool in response to the actuation of the input device.

3. A hand-operated electric power tool as defined in claim 1 further comprising an analog switch controlled by signals from the other part of output signals of the storage device, the analog switch being coupled to said means for controlling the operation of the tool to fix the rotary speed in response to an actuation of the data input device.

4. A hand-operated electric power tool as defined in claim 1 wherein signals from the one part of data outputs of the storage device activate the display device to indicate the desired rotary speed of the tool.

5. A hand-operated electric power tool as defined in claim 1 wherein said data input device includes pushbuttons for delivering binary coded address word to the addressing inputs of the storage device.

6. A hand-operated electric power tool as defined in claim 1 wherein the data input device includes a rotary knob provided with switching contacts for delivering a binary coded address word to the addressing inputs of the storage device.

7. A hand-operated electric power tool as defined in claim 1 wherein the data input device includes at least one pushbutton cooperating with an electronic circuit for generating a succession of binary data in response to repeated depressions of the pushbutton.

8. A hand-operated electric power tool as defined in claim 7 wherein said electronic circuit includes a shift register connected between the data input device and the addressing inputs of the storage device.

* * * * *